United States Patent
Khoo et al.

(10) Patent No.: US 9,100,348 B2
(45) Date of Patent: Aug. 4, 2015

(54) MANAGING SIDEBAND ROUTERS IN ON-DIE SYSTEM FABRIC

(71) Applicant: Intel Corporation, Santa Clara, CA (US)

(72) Inventors: Kay Keat Khoo, Bayan Lepas (MY); Vui Yong Liew, Bukit Mertajam (MY); Hai Ming Khor, Bukit Mertajam (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/631,871

(22) Filed: Sep. 29, 2012

(65) Prior Publication Data
US 2013/0083804 A1 Apr. 4, 2013

(30) Foreign Application Priority Data
Oct. 3, 2011 (MY) .......................... PI 2011004733

(51) Int. Cl.
*H04L 12/773* (2013.01)
*H04L 12/64* (2006.01)
*G06F 13/38* (2006.01)

(52) U.S. Cl.
CPC ............... *H04L 45/60* (2013.01); *G06F 13/38* (2013.01); *H04L 12/6418* (2013.01)

(58) Field of Classification Search
USPC .................. 370/351, 390, 401, 409, 410, 419; 327/564, 565; 710/3, 29, 30, 36, 105, 710/240, 311, 313, 306; 711/170, 202, 203, 711/206; 713/100, 300
See application file for complete search history.

(56) References Cited

U.S. PATENT DOCUMENTS

| 6,009,488 A | 12/1999 | Kavipurapu |
| 2002/0184345 A1 | 12/2002 | Masuyama et al. |
| 2003/0007493 A1 | 1/2003 | Oi et al. |
| 2005/0152332 A1 * | 7/2005 | Hannum et al. ............. 370/351 |
| 2010/0064104 A1 * | 3/2010 | Steinmetz et al. ............ 711/114 |
| 2010/0091685 A1 | 4/2010 | Agrawal et al. |
| 2010/0250889 A1 | 9/2010 | Fang et al. |
| 2011/0035526 A1 | 2/2011 | Slaight |
| 2011/0080920 A1 * | 4/2011 | Klinglesmith et al. ....... 370/419 |
| 2011/0131456 A1 | 6/2011 | Klinglesmith et al. |
| 2011/0320671 A1 * | 12/2011 | Armstrong et al. ........... 710/306 |

FOREIGN PATENT DOCUMENTS

WO 2013/052503 A1 4/2013

OTHER PUBLICATIONS

International Search Report and Written Opinion received for the PCT Application No. PCT/US2012/058488, mailed on Feb. 14, 2013, 8 pages.
International Preliminary Report on Patentability and Written Opinion received for PCT Patent Application No. PCT/US2012/058488, mailed on Apr. 17, 2014, 7 pages.

* cited by examiner

*Primary Examiner* — Edan Orgad
*Assistant Examiner* — Saumit Shah
(74) *Attorney, Agent, or Firm* — Alpine Technology Law Group LLC

(57) ABSTRACT

Methods and apparatus for managing sideband routers in an On-Die System Fabric (OSF) are described. In one embodiment, a sideband OSF router is configurable during runtime based, at least in part, on information stored in a table accessible by an agent coupled to the sideband OSF router. Other embodiments are also disclosed.

20 Claims, 4 Drawing Sheets

MANAGING SIDEBAND ROUTERS IN ON-DIE SYSTEM FABRIC

CROSS REFERENCE TO RELATED APPLICATIONS

This application claims priority to Malaysian patent application PI2011004733 filed on Oct. 3, 2011 (which is incorporated herein by reference in its entirety).

FIELD

The present disclosure generally relates to the field of electronics. More particularly, an embodiment of the invention relates to techniques for managing sideband routers in an On-Die System Fabric (OSF).

BACKGROUND

An integrated circuit chip generally includes many components. Overall performance of the chip may be directly related to how quickly these components communicate with each other. To communicate data between the components various communication mechanisms may be used. However, the communication mechanisms may not be readily configurable, e.g., due to complexity, costs, etc. This may in turn reduce flexibility in configuring the communication mechanisms.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

In some embodiments, sideband routers in an OSF may be configured via a Router Management Endpoint (RM Endpoint). Generally, an OSF may include a primary portion and a sideband portion. The sideband portion may include one or more OSF sideband router(s) (e.g., to route messages between various agents in the OSF) and endpoint(s) (e.g., agents in the OSF that transmit or receive message(s)). The endpoints may communicate with each other by sending messages that travel over point-to-point interface links through the routers in the OSF. As discussed herein, "sideband" network, fabric, portion, channel, etc. generally refers to an interface for communicating out-of-band information, e.g., to eliminate special purpose wires that pose the biggest risk for reuse of circuitry blocks (such as Intellectual Property (IP) blocks) in different designs. Moreover, the sideband message interface may be used for status, power management, configuration shadowing, test modes, etc. in various embodiments.

Moreover, in some instances OSF sideband routers may not be configurable without regeneration of RTL (Register Transfer Logic) and re-synthesis of design to add new Endpoint or change port ID (Identifier). Also, multiple port IDs may be allocated to a specific endpoint or subtractive decode may have to be performed to allow Port ID change. To this end, some embodiments allow sideband OSF routers to be configurable to avoid regeneration of RTL or re-synthesis of design, e.g., by re-using the existing routers in OSF sideband through routing table reconfiguration (by using firmware for example).

Figure 1:
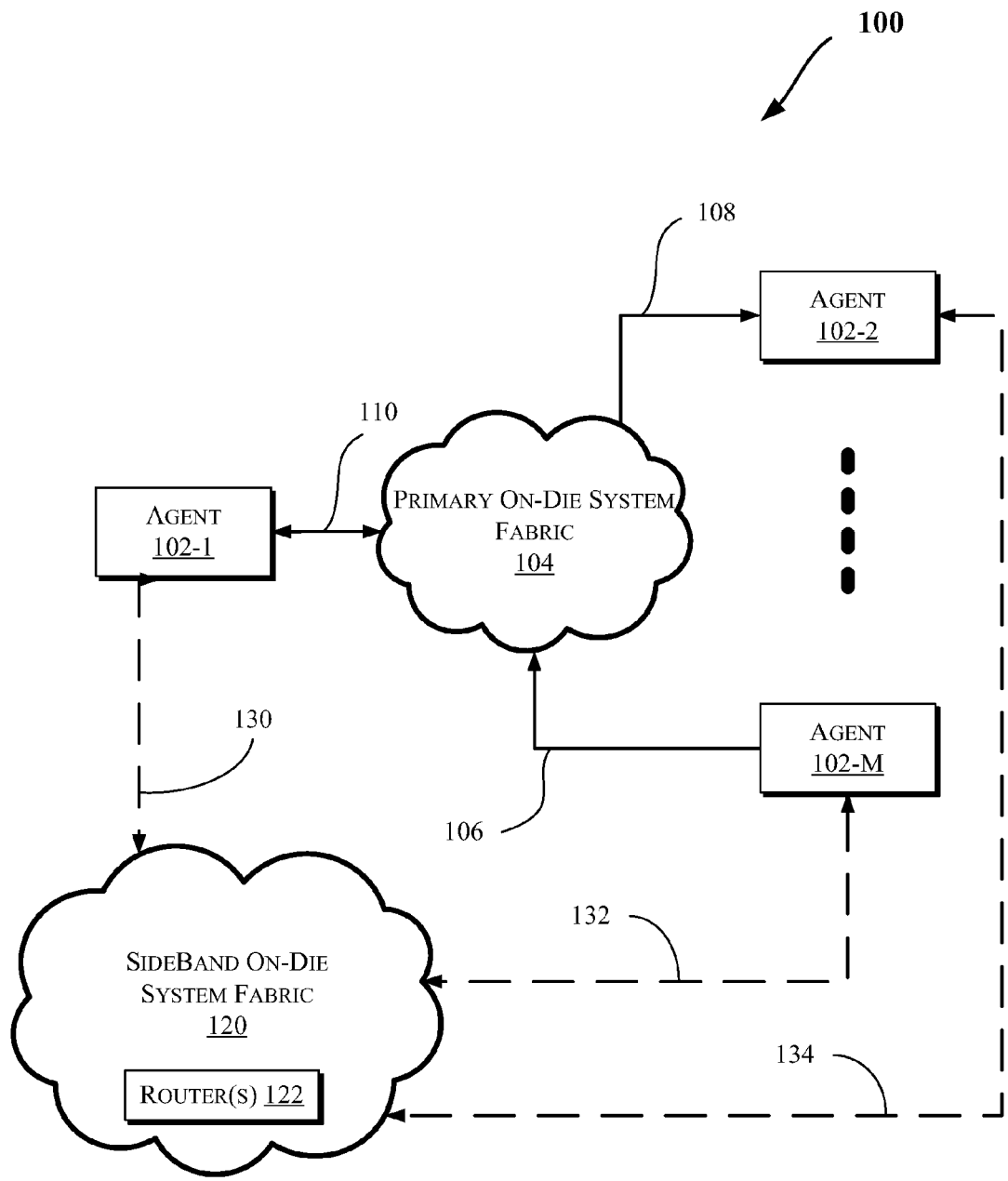
FIGS. 1-4 illustrate block diagrams of embodiments of computing systems, which may be utilized to implement various embodiments discussed herein.

Techniques discussed herein may be applied in various computing systems, such as those discussed with reference to FIGS. 1 and 3-4. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIGS. 3-4.

As illustrated in FIG. 1, the agents 102 may communicate via a primary fabric 104, such as an OSF. Hence, agents 102 and fabric 104 may be present on the same integrated circuit die in an embodiment. As discussed herein, "OSF" may refer to an On-Die System Fabric which is scalable, configurable, and/or product specific. For example, each of the agents 102 may be a bridge (e.g., for coupling to another fabric), IP block, or another component of an electronic device which are coupled via the fabric 104. In one embodiment, the fabric 104 may include a computer network that allows various agents (such as computing devices) to communicate data. In an embodiment, the fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the fabric 104 may provide communication that adheres to one or more cache coherent protocols. Alternatively, fabric 104 may adhere to non-coherent protocols.

Furthermore, as shown by the direction of arrows in FIG. 1, the agents 102 may transmit and/or receive data via the fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110). In some embodiments, links 106-110 may be OSF interfaces that provide protocol and/or signaling to allow IP blocks to interoperate across multiple designs.

In an embodiment, OSF interfaces that couple the agents 102 (e.g., links 106-110) may provide two ports referred to as primary channel and sideband channel. The primary channel may: (a) be a high performance interface for data transfer between peers and/or upstream; (b) support memory (e.g., 32 bit, 44 bit), input/output (IO), configuration, and message transactions; (c) support Peripheral Component Interconnect (PCI) Express ("PCIe", in accordance with PCI Express Base Specification 3.0, Revision 0.5, August 2008) ordering rules and/or enumeration; (d) support split transaction protocol; and/or (e) maps PCIe header information. The sideband channel may: (i) provide a standard interface to communicate sideband (also referred to herein interchangeable as "out-of-band") information and eliminate special purpose wires; (ii) provide a point-to-point network; (iii) be used for status, power management, configuration shadowing, test modes, etc.; and/or (iv) be used for low performance (e.g., not intended for primary data transfers).

As shown in FIG. 1, the sideband channel may be provided through a sideband OSF 120, in some embodiments. The sideband OSF 120 may include one or more routers 122 that facilitate communication of out-of-band messages between two or more agents 102 via interfaces 130, 132, and 134. Interfaces 130, 132, and 134 may be implemented as point-to-point links. Also, the point-to-point links may be bidirectional or unidirectional (e.g., with one unidirectional link dedicated to transmit and another dedicated to receipt of messages).

Figure 2:
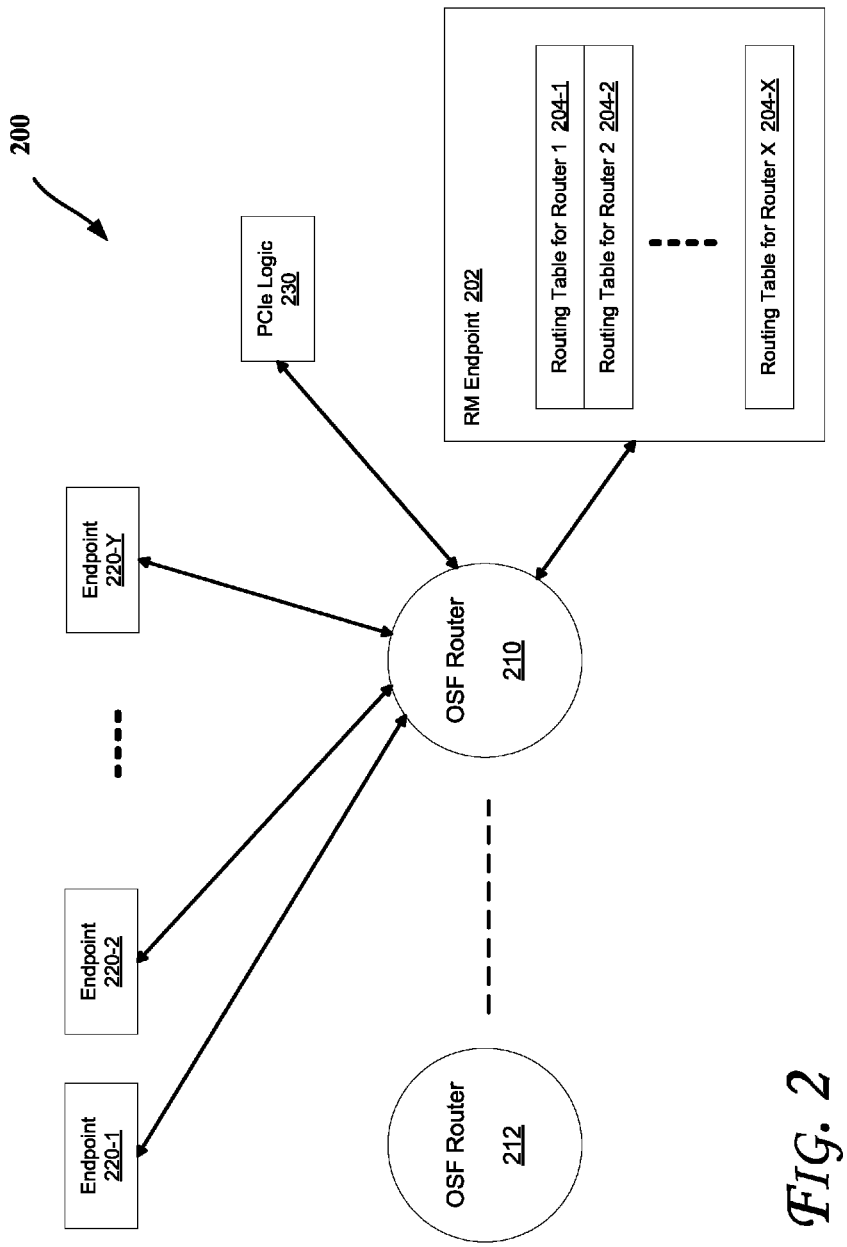

FIG. 2 illustrates a block diagram of a system 200 with various components that may be present in an OSF-based design, according to an embodiment. In one embodiment, at least one of the endpoints in system 200 (such as agents 102 discussed with reference to FIG. 1) may be configured as an RM endpoint 202 (where the RM endpoint 202 may be one of the agents 102 discussed with reference to FIG. 1 in one embodiment). The RM endpoint 202 may have access to and/or include one or more (programmable) routing tables (for one or more routers in system 200, e.g., tables 204-1 to 204-X). For example, routing table 204-1 may correspond to OSF router 210, routing table 204-2 may correspond to OSF router 212, etc. RM Endpoint 202 itself may have a fixed/static Port ID. Also, RM endpoint 202 may communicate with one or more other endpoints 220-1 to 220-Y and/or PCIe logic 230 via OSF router 210. Alternatively, endpoint 202 may be coupled to more than one OSF router.

In some embodiments, the OSF routers (e.g., routers 210, 212, etc.) may obtain various stored information from RM endpoint 202 (e.g., from tables 204-1 to 204-X) including one or more of: (1) Port ID of each endpoint coupled to the OSF routers, e.g., to determine routing; (2) supported opcode information for packet communication via the sideband OSF routers (as will be further discussed below); and/or (3) status of each endpoint coupled to the OSF routers (where status of endpoint may be either enabled or disabled, e.g., per a stored bit). Accordingly, each table 204-1 to 204-X may include items (1) to (3) for each endpoint (e.g., per an endpoint identifier stored in the tables 204-1 to 204-X).

In an embodiment, the RM Endpoint 202 allows secured system logic such as Manageability Engine (ME) firmware (which may be store in a memory such as those discussed with reference to FIGS. 3-4, including a cache or memory in a system, e.g. memory 410) to configure OSF routers (e.g., routers 210 and/or 212). One application for this RM Endpoint is to allow supported Operation Code (opcode) to be programmed. ME firmware may restrict or program new supported opcode through RM Endpoint and OSF Router will be able to process communication packets with this new opcode after being reconfigured. This may also be used to tighten OSF Sideband security to restrict only certain op-codes to be routed through OSF Sideband.

In one embodiment, RM Endpoint 202 may also be used to change routing of communication packets with certain op-codes of each device controller (e.g., for each endpoint 220-1 to 220-Y) coupled to OSF Sideband 120. One application for this is to allow redirection of communication packets. For example, communication packets may be redirected to ME for one or more additional service routine before being re-routed by OSF Routers to intended port(s). Moreover, a device controller Endpoint coupled to sideband OSF 120 may be enabled or disabled (e.g., per one bit as discussed above) during runtime through RM Endpoint configuration. This may be used to lock (or reduce access to) the device controller from further access through OSF sideband for security reasons or to isolate the device port during debugging. Device controller endpoint may also be locked if this feature has been disabled.

In some embodiments, the RM Endpoint tables may be implemented as a programmable Register Block, e.g., only accessible by some secured logic such as ME firmware or Power Management Controller (PMC) firmware. OSF Routers may also include logic to make routing table configurable from RM Endpoint. ME or PMC firmware flow may also be modified to configure RM Endpoint during platform boot. In some embodiments, PMC and/or ME may be provided in any of the components of the systems discussed with reference to FIGS. 1 and 3-4.

In accordance with some embodiments, sideband routers may be managed (e.g., by RM endpoint 202) to: (a) configure the OSF per customer before shipping; (b) configure certain security requirements based on customer needs; (c) provide run-time configuration for routing messages between agents coupled to an OSF; and/or (d) as part of the security, disable a device on the OSF network.

Various types of computing systems may be used to implement the embodiments discussed herein (such as those discussed with reference to FIGS. 1-2). For example, FIG. 3 illustrates a block diagram of an embodiment of a computing system 300. One or more of the agents 102 of FIG. 1 may comprise one or more components of the computing system 300. The computing system 300 may include one or more central processing unit(s) (CPUs) 302 (which may be collectively referred to herein as "processors 302" or more generically "processor 302") coupled to an interconnection network (or bus) 304. The processors 302 may be any type of processor such as a general purpose processor, a network processor (which may process data communicated over a computer network 305), etc. (including a reduced instruction set computer (RISC) processor or a complex instruction set computer (CISC)). Moreover, the processors 302 may have a single or multiple core design. The processors 302 with a multiple core design may integrate different types of processor cores on the same integrated circuit (IC) die. Also, the processors 302 with a multiple core design may be implemented as symmetrical or asymmetrical multiprocessors.

The processor 302 may include one or more caches and/or Memory Management Units (MMUs, not shown). The caches may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 300. As shown in FIG. 3, the OSFs 104/120 may be coupled between one or more IP blocks 303 and the processor(s) 302 (e.g., through the interconnect 304).

A chipset 306 may additionally be coupled to the interconnection network 304. Further, the chipset 306 may include a memory control hub (MCH) 308. The MCH 308 may include a memory controller 310 that is coupled to a memory 312. The memory 312 may store data, e.g., including sequences of instructions that are executed by the processor 302, or any other device in communication with components of the computing system 300. In an embodiment, the memory 312 may be used to store data such as discussed with reference to FIGS. 1-3 (such as a page table). Also, in one embodiment of the invention, the memory 312 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 304, such as multiple processors and/or multiple system memories.

The MCH 308 may further include a graphics interface 314 coupled to a display device 316 (e.g., via a graphics accelerator in an embodiment). In one embodiment, the graphics interface 314 may be coupled to the display device 316 via an accelerated graphics port (AGP). In an embodiment of the invention, the display device 316 (such as a flat panel display) may be coupled to the graphics interface 314 through, for example, a signal converter that translates a digital representation of an image stored in a storage device such as video memory or system memory (e.g., memory 312) into display signals that are interpreted and displayed by the display 316.

Figure 3:
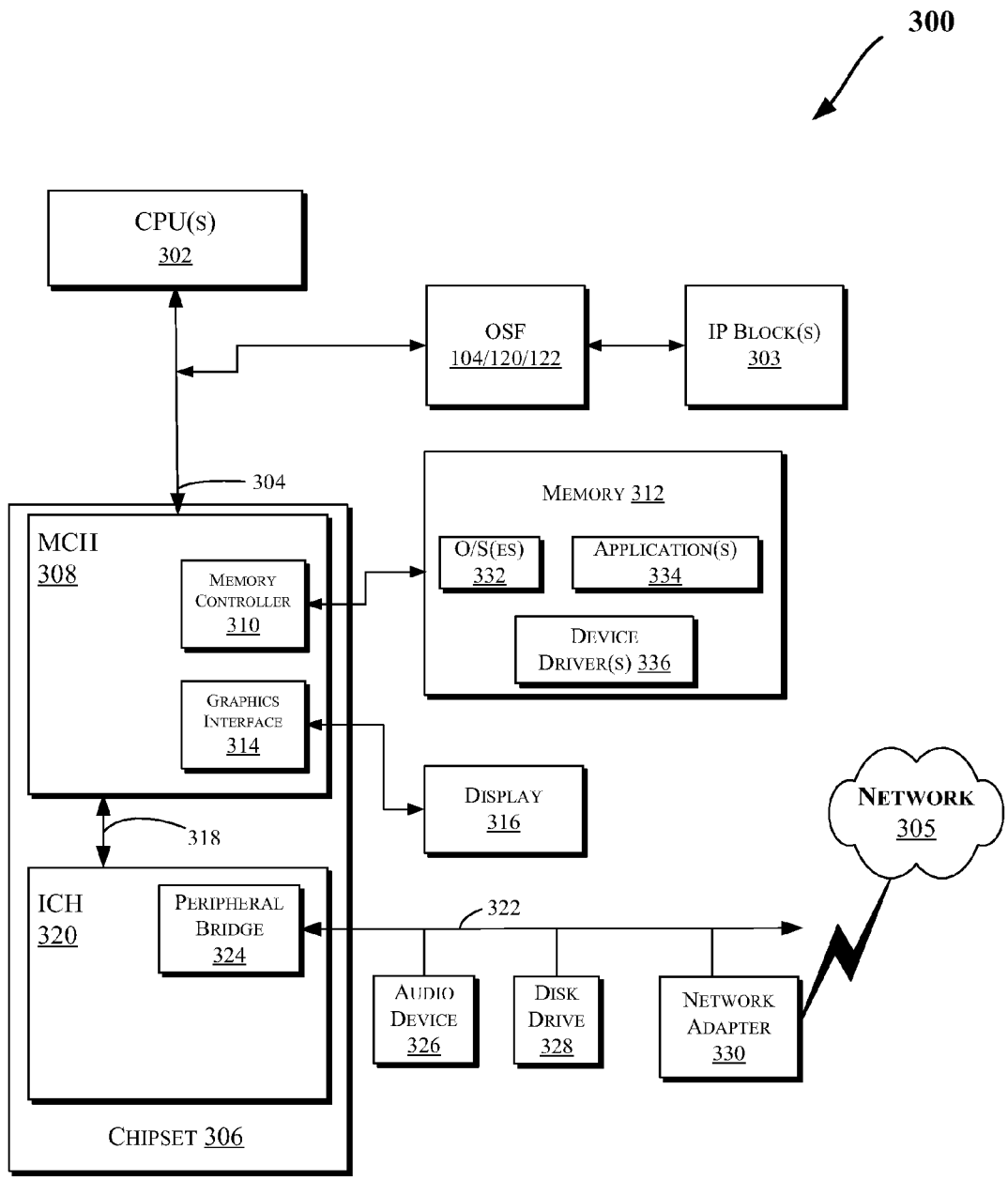

As shown in FIG. 3, a hub interface 318 may couple the MCH 308 to an input/output control hub (ICH) 320. The ICH 320 may provide an interface to input/output (I/O or IO) devices coupled to the computing system 300. The ICH 320 may be coupled to a bus 322 through a peripheral bridge (or controller) 324, such as a peripheral component interconnect (PCI) bridge that may be compliant with the PCIe specification, a universal serial bus (USB) controller, etc. The bridge 324 may provide a data path between the processor 302 and peripheral devices. Other types of topologies may be utilized. Also, multiple buses may be coupled to the ICH 320, e.g., through multiple bridges or controllers. For example, the bus 322 may comply with the PCI Local Bus Specification, Revision 3.0, 2004, available from the PCI Special Interest Group, Portland, Oreg., U.S.A. (hereinafter referred to as a "PCI bus"). Alternatively, the bus 322 may comprise a bus that complies with the PCI-X Specification Rev. 3.0a, 2003 (hereinafter referred to as a "PCI-X bus") and/or PCI Express (PCIe) Specifications (PCI Express Base Specification 3.0, Revision 0.5, August 2008), available from the aforementioned PCI Special Interest Group, Portland, Oreg., U.S.A. Further, the bus 322 may comprise other types and configurations of bus systems. Moreover, other peripherals coupled to the ICH 320 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 322 may be coupled to an audio device 326, one or more disk drive(s) 328, and a network adapter 330 (which may be a NIC in an embodiment). In one embodiment, the network adapter 330 or other devices coupled to the bus 322 may communicate with the chipset 306 via the switching logic 312 (which may be the same or similar to the logic 312 of FIG. 3 in some embodiments). Other devices may be coupled to the bus 322. Also, various components (such as the network adapter 330) may be coupled to the MCH 308 in some embodiments of the invention. In addition, the processor 302 and the MCH 308 may be combined to form a single chip.

Additionally, the computing system 300 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 328), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 312 may include one or more of the following in an embodiment: an operating system (O/S) 332, application 334, and/or device driver 336 (such as the OS, application(s), and/or device drivers). The memory 312 may also include regions dedicated to MMIO operations. Programs and/or data stored in the memory 312 may be swapped into the disk drive 328 as part of memory management operations. The application(s) 334 may execute (e.g., on the processor(s) 302) to communicate one or more packets with one or more computing devices coupled to the network 305. In an embodiment, a packet may be a sequence of one or more symbols and/or values that may be encoded by one or more electrical signals transmitted from at least one sender to at least on receiver (e.g., over a network such as the network 305). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 305).

In an embodiment, the application 334 may utilize the O/S 332 to communicate with various components of the system 300, e.g., through the device driver 336. Hence, the device driver 336 may include network adapter 330 specific commands to provide a communication interface between the O/S 332 and the network adapter 330, or other I/O devices coupled to the system 300, e.g., via the chipset 306.

In an embodiment, the O/S 332 may include a network protocol stack. A protocol stack generally refers to a set of procedures or programs that may be executed to process packets sent over a network 305, where the packets may conform to a specified protocol. For example, TCP/IP (Transport Control Protocol/Internet Protocol) packets may be processed using a TCP/IP stack. The device driver 336 may indicate the buffers 338 that are to be processed, e.g., via the protocol stack.

The network 305 may include any type of computer network. The network adapter 330 may further include a direct memory access (DMA) engine 352, which writes packets to buffers (e.g., stored in the memory 312) assigned to available descriptors (e.g., stored in the memory 312) to transmit and/or receive data over the network 305.

Figure 4:
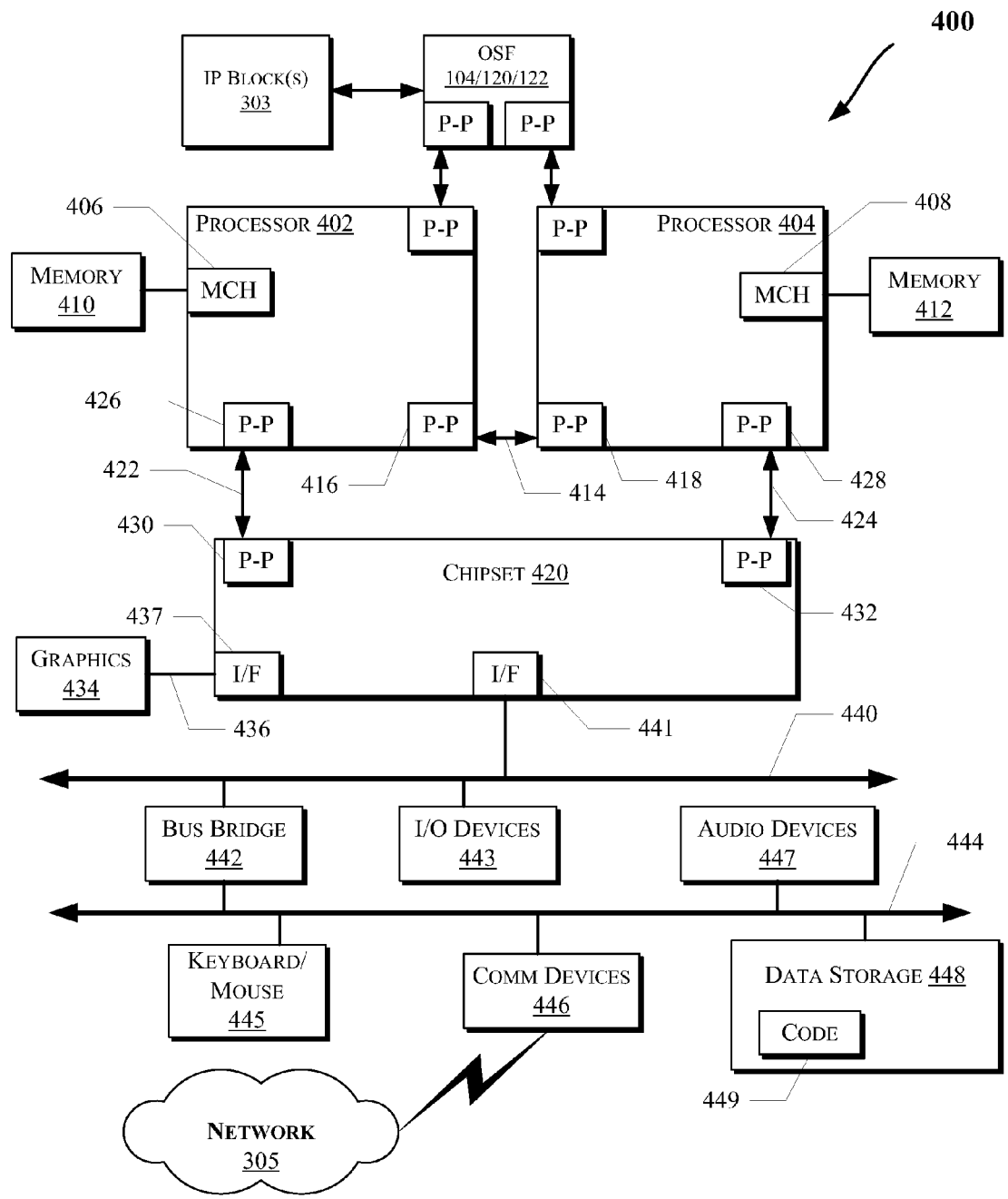

FIG. 4 illustrates a computing system 400 that is arranged in a point-to-point (PtP) configuration, according to an embodiment of the invention. In particular, FIG. 4 shows a system where processors, memory, and input/output devices are interconnected by a number of point-to-point interfaces. The operations discussed with reference to FIGS. 1-3 may be performed by one or more components of the system 400.

As illustrated in FIG. 4, the system 400 may include several processors, of which only two, processors 402 and 404 are shown for clarity. The processors 402 and 404 may each include a local memory controller hub (MCH) 406 and 408 to enable communication with memories 410 and 412 (which may store MMIO regions). The memories 410 and/or 412 may store various data such as those discussed with reference to the memory 312 of FIG. 3. As shown in FIG. 4, the processors 402 and 404 may also include one or more cache(s) such as those discussed with reference to FIG. 3.

In an embodiment, the processors 402 and 404 may be one of the processors 302 discussed with reference to FIG. 3. The processors 402 and 404 may exchange data via a point-to-point (PtP) interface 414 using PtP interface circuits 416 and 418, respectively. Also, the processors 402 and 404 may each exchange data with a chipset 420 via individual PtP interfaces 422 and 424 using point-to-point interface circuits 426, 428, 430, and 432. The chipset 420 may further exchange data with a high-performance graphics circuit 434 via a high-performance graphics interface 436, e.g., using a PtP interface circuit 437.

In at least one embodiment, the OSFs 104/120 may couple the processors 402, 404 (through PtP interfaces, for example) to one or more IP blocks 303. Other embodiments of the invention, however, may exist in other circuits, logic units, or devices within the system 400 of FIG. 4. Furthermore, other embodiments of the invention may be distributed throughout several circuits, logic units, or devices illustrated in FIG. 4. Also, processor(s) 402, 404 may include MMU(s). Further, OSF 104/120 may be located elsewhere in system 400, such as within chipset 420, communication device(s) 446, devices coupled to bus 440/744, etc.

The chipset 420 may communicate with the bus 440 using a PtP interface circuit 441. The bus 440 may have one or more devices that communicate with it, such as a bus bridge 442 and I/O devices 443. Via a bus 444, the bus bridge 442 may communicate with other devices such as a keyboard/mouse 445, communication devices 446 (such as modems, network interface devices, or other communication devices that may communicate with the computer network 305), audio I/O device, and/or a data storage device 448. The data storage device 448 may store code 449 that may be executed by the processors 402 and/or 404.

In various embodiments of the invention, the operations discussed herein, e.g., with reference to FIGS. 1-4, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The (e.g., non-transitory) machine-readable medium may include a storage device such as those discussed with respect to FIGS. 1-4. Additionally, such computer-readable media may be downloaded as a computer program product, wherein the program may be transferred from a remote computer (e.g., a server) to a requesting computer (e.g., a client) through data signals provided in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An integrated circuit comprising:
a sideband On-Die System Fabric (OSF) router to couple a first agent and a second agent; and
the first agent to access a routing table, the routing table to store routing information for the sideband OSF router,
wherein the sideband OSF router is reconfigurable during runtime based, at least in part, on the routing information stored in the routing table, wherein the routing table is to comprise one or more of: a port identifier for each agent coupled to the sideband OSF router, supported operational code (opcode) information for packet communication via the sideband OSF router, and status of each agent coupled to the sideband OSF router, wherein only a packet with an opcode from the supported opcode information is allowed to be routed through the sideband OSF router, wherein secured logic is to cause the sideband OSF router to be reconfigured based on the supported opcode information.

2. The integrated circuit of claim 1, wherein the secured logic is to perform one or more service routines on the packet before the packet is routed to a destination by the sideband OSF router.

3. The integrated circuit of claim 1, wherein the status of each agent is to indicate whether that agent is enabled or disabled.

4. The integrated circuit of claim 1, further comprising a plurality of sideband OSF routers, wherein the first agent is to comprise at least one routing table for each of the plurality of sideband OSF routers.

5. The integrated circuit of claim 1, wherein the first agent has a static port identifier.

6. The integrated circuit of claim 1, wherein the first agent is to be coupled to a plurality of sideband OSF routers.

7. The integrated circuit of claim 1, wherein the first agent is to comprise a processor.

8. The integrated circuit of claim 7, wherein the processor is to comprise one or more processor cores.

9. The integrated circuit of claim 1, wherein the second agent is to comprise a logic block.

10. The integrated circuit of claim 1, wherein the routing table is only accessible by firmware to reconfigure the sideband OSF router during runtime.

11. A method comprising:
storing routing information in a routing table coupled to a first agent; and
reconfiguring a sideband On-Die System Fabric (OSF) router during runtime based, at least in part, on the stored routing information in the routing table, wherein the routing table comprises one or more of: a port identifier for each agent coupled to the sideband OSF router, supported operational code (opcode) information for packet communication via the sideband OSF router, and status of each agent coupled to the sideband OSF router, wherein only a packet with an opcode from the supported opcode information is allowed to be routed through the sideband OSF router, wherein the sideband OSF router is reconfigured based on the supported opcode information.

12. The method of claim 11, further comprising performing one or more service routines on a packet before the packet is routed to a destination by the sideband OSF router.

13. The method of claim 11, wherein the status of each agent is to indicate whether that agent is enabled or disabled.

14. The method of claim 11, further comprising accessing the routing table only by firmware to reconfigure the sideband OSF router during runtime.

15. A system comprising:
an input/output (IO) device;
a sideband On-die System Fabric (OSF) router to couple a processor to the IO device; and
a routing table to store routing information for the sideband OSF router,
wherein the sideband OSF router is reconfigurable during runtime based, at least in part, on the routing information stored in the routing table, wherein the routing table is to comprise one or more of: a port identifier for each agent coupled to the sideband OSF router, supported operational code (opcode) information for packet communication via the sideband OSF router, and status of each agent coupled to the sideband OSF router, wherein only a packet with an opcode from the supported opcode information is allowed to be routed through the sideband OSF router, wherein secured logic is to cause the sideband OSF router to be reconfigured based on the supported opcode information.

16. The system of claim 15, wherein the routing table is only accessible by firmware to reconfigure the sideband OSF router during runtime.

17. The system of claim 15, wherein the secured logic is to perform one or more service routines on the packet before the packet is routed to a destination by the sideband OSF router.

18. The system of claim 15, wherein the status of each agent is to indicate whether that agent is enabled or disabled.

19. The system of claim 15, further comprising a plurality of sideband OSF routers, wherein the first agent is to comprise at least one routing table for each of the plurality of sideband OSF routers.

20. The system of claim 15, wherein the first agent is to comprise a processor or the second agent is to comprise a logic block.

* * * * *